(12) United States Patent
Al-Khabbaz et al.

(10) Patent No.: US 10,038,670 B2
(45) Date of Patent: Jul. 31, 2018

(54) SYSTEM AND METHOD FOR CONTROLLING ACCESS TO A PLANT NETWORK

(75) Inventors: Fouad M. Al-Khabbaz, Majeediah (SA); Zakarya A. Abu Al-Saud, Saihat (SA); Saad A. Al-Harbi, Dhahran (SA); Osama R. Al-Khunaizi, Dhahran (SA); Hussain A. Al-Salem, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 547 days.

(21) Appl. No.: 13/877,310

(22) PCT Filed: Sep. 29, 2011

(86) PCT No.: PCT/US2011/053991
§ 371 (c)(1),
(2), (4) Date: Aug. 12, 2013

(87) PCT Pub. No.: WO2012/044821
PCT Pub. Date: Apr. 5, 2012

(65) Prior Publication Data
US 2013/0326610 A1  Dec. 5, 2013

Related U.S. Application Data

(60) Provisional application No. 61/388,540, filed on Sep. 30, 2010.

(51) Int. Cl.
*G06F 15/16* (2006.01)
*H04L 29/06* (2006.01)
*G06Q 10/06* (2012.01)

(52) U.S. Cl.
CPC ......... *H04L 63/0236* (2013.01); *G06Q 10/06* (2013.01); *H04L 63/0209* (2013.01); *G06Q 10/067* (2013.01)

(58) Field of Classification Search
CPC .................... H04L 29/08072; H04L 29/06
(Continued)

(56) References Cited

U.S. PATENT DOCUMENTS 5,724,254 A * 3/1998 Millett .................. G01N 33/18
702/179
6,178,362 B1 * 1/2001 Woolard ............... G01R 22/00
700/28

(Continued)

*Primary Examiner* — Khanh Dinh
(74) *Attorney, Agent, or Firm* — Abelman, Frayne & Schwab

(57) ABSTRACT

A system for centrally controlling access by computers in a corporate network to a plant network that runs plant applications. The system includes an access control computer in communication with the corporate network and includes a memory, a processor coupled to the memory and a multi-user application stored in the memory and executable by the processor. The multi-user application communicates with a plurality of computers in the corporate network concurrently and communicates with at least one plant application running in the plant network to retrieve data from and pass data to the plant application on behalf of the plurality of computers in the corporate network concurrently. Since all communication from the plurality of computers is tunneled through the access control computer, the likelihood of any virus or worm spreading into the plant network is minimized.

6 Claims, 4 Drawing Sheets

(58) Field of Classification Search
USPC ................................. 709/203, 220, 224, 227
See application file for complete search history.

(56) References Cited

U.S. PATENT DOCUMENTS

| | | | | |
|---|---|---|---|---|
| 6,452,923 | B1* | 9/2002 | Gerszberg | H04N 21/2143 |
| | | | | 370/352 |
| 6,636,893 | B1* | 10/2003 | Fong | G01R 22/00 |
| | | | | 370/252 |
| 7,599,620 | B2* | 10/2009 | Graves | H04Q 11/0066 |
| | | | | 398/51 |
| 7,614,083 | B2* | 11/2009 | Khuti | H04L 63/02 |
| | | | | 726/22 |
| 8,214,271 | B2* | 7/2012 | Lefebvre et al. | 705/35 |
| 8,396,695 | B2* | 3/2013 | Kelly | G06Q 10/067 |
| | | | | 700/29 |
| 8,880,202 | B2* | 11/2014 | Francino | G05B 17/02 |
| | | | | 700/28 |
| 2006/0053491 | A1* | 3/2006 | Khuti | H04L 63/02 |
| | | | | 726/23 |
| 2006/0294579 | A1* | 12/2006 | Khuti | H04L 63/02 |
| | | | | 726/3 |
| 2010/0082293 | A1* | 4/2010 | Mitchell | G05B 19/0428 |
| | | | | 702/182 |
| 2012/0198541 | A1* | 8/2012 | Reeves | 726/13 |
| 2014/0336786 | A1* | 11/2014 | Asenjo et al. | 700/17 |

* cited by examiner

SYSTEM AND METHOD FOR CONTROLLING ACCESS TO A PLANT NETWORK

CROSS REFERENCE TO RELATED APPLICATIONS

This application claims priority under 35 U.S.C. 119(e) to U.S. Provisional Application No. 61/388,540, filed Sep. 30, 2010, which is incorporated herein by reference.

FIELD OF THE INVENTION

The present invention relates to access management systems, and more particularly to a system and method for managing access to a plant network that monitors and controls plant data.

BACKGROUND OF THE INVENTION

Generally. a company in industrial production operates two computer systems/networks: a corporate network 2 and a plant network 4 as shown in FIG. 1. A corporate network 2 includes a group of computers that are connected together which are used to manage the company's operations such as management, sales, engineering and human resources, but excludes industrial production. On the other hand, a plant network 4 includes several types of control systems that are used in industrial production, including supervisory control and data acquisition (SCADA) systems, distributed control systems (DCS), Process Automation Network (PAN), Distributed Control Systems (DCS), Emergency Shutdown Systems (ESD), Terminal Management Systems (TMS), networked electronic sensing systems, Power Monitoring System (PMS), Vibration Monitoring systems (VMS) and other smaller control system configurations such as programmable logic controllers (PLC) and remote terminal units (RTU).

As shown in FIG. 1, the corporate network 2 is separated from the plant network 4 by a filtering device 28 to prevent unauthorized access. Typically, a filtering device includes a firewall device which may be a part of a router device for routing communication messages. Each computer on the corporate network 2 side has access to various plant applications residing on plant applications servers to retrieve plant data that might originate from remote stations. Based on information received from remote stations, automated or operator-driven supervisory commands can be pushed to remote station control devices, which are often referred to as field devices. Field devices control local operations such as opening and closing of valves and breakers, collecting data from sensor systems, and monitoring the local environment for alarm conditions.

In the exemplary plant network 4 of FIG. 2, it includes a SCADA system 40, DCS 42 and plant servers 30 running various plant applications that collect, analyze and control various plant devices. The SCADA system 40 includes several remote stations 44 each containing RTU/PLCs' connected to various control devices such as valves and pumps, and sensors such as level sensor, pressure sensor and flow sensor. The DCS 42 includes process controllers and PLCs' connected to sensors and control devices such as motors and valves.

Typically, individual security rules are configured on the firewall device 28 for each computer residing on the corporate network 2 for an authorized access to any plant application in the plant network 4. As can be appreciated, this results in hundreds of security rules being configured on the firewall. In other words, current methodologies are mainly focused on separating the two networks via a firewall system. However, such firewall allows numerous authorized network connections to pass through since any computer on the corporate network 2 side can access and interact with any plant application or plant server on the plant network 4.

Such numerous connections typically introduce the following deficiencies: 1) unnecessary processing load and configuration of multiple security policies on the firewall due to the need to code the firewall individually for each computer in the corporate network; 2) higher computer virus spread probability due to multiple connections; and 3) plant application incompatibilities and access difficulties.

Therefore, it would be desirable to provide a system and method for more securely control and yet more easily maintain access to plant networks.

SUMMARY OF DISCLOSURE

According one aspect of the present invention, a system for centrally controlling access by computers in a corporate network to a plant network that runs plant applications is provided. The system includes an access control computer in communication with the corporate network. The access control computer includes a memory, a processor coupled to the memory and a multi-user application stored in the memory and executable by the processor. The multi-user application communicates with a plurality of computers in the corporate network concurrently and communicates with at least one plant application running in the plant network to retrieve data from and pass data to the plant application on behalf of the plurality of computers in the corporate network concurrently. Since all communication from the plurality of computers is funneled through the access control computer, the likelihood of any virus or worm spreading into the plant network is minimized.

In another aspect of the present invention, the access control computer includes a hosting software for hosting a hosted application. The hosted application communicates with a plurality of computers in the corporate network; and communicates with at least one plant application running in the plant network to retrieve data from and pass data to the plant application on behalf of the plurality of computers in the corporate network.

In another aspect of the present invention, a filtering device is positioned between the access control computer and the plant network and passes to the plant network only the messages originated by the access control computer.

In another aspect of the present invention, a method of centrally controlling access by computers in a corporate network to a plant network that runs plant applications is provided. The method involves providing an access control computer in communication with the corporate network. The access control computer includes a memory; a processor coupled to the memory and a multi-user application stored in the memory and executable by the processor. The multi-user application communicates with a plurality of computers in the corporate network concurrently and communicates with at least one plant application running in the plant network to retrieve data from and pass data to the plant application on behalf of the plurality of computers in the corporate network concurrently. When a message is received by a filtering device, it passes the received message to the plant network only if the received message is determined to be from the access control computer.

DETAILED DESCRIPTION

The present invention eliminates the above described problems by using a single link connector (SLC) which is preferably located in a single secure location. The SLC is a computer (see FIG. 4, for example) that resides on the corporate network 2 side as a standalone system or as an integrated part of an Ethernet switch (module), to provide a unified access to plant applications such as a vibration and power monitoring application through the plants. In other words, rather than allow each computer on the corporate network 2 to communicate with the various plant applications residing in the plant network 4, those plant applications are only allowed to communicate with the SLC and not with any other computer on the corporate network.

Thus, the SLC consolidates numerous individual network connections originating from the corporate network, thus minimizing firewall security rules to configure and maintain. It improves the current architecture of corporate-to-plant network interface design by adding a device that consolidates all network connections into a single connection.

The SLC design also significantly reduces the probability of virus and malware spread to/from the plant network 4, since the firewall separating the corporate network 2 from the plant network will inspect traffic from preferably a single computer, which is already protected and secured physically and logically.

The SLC can be configured with custom off-the-shelf (CoS) software to provide additional features such as application visualization and representation to enhance application compatibility and facilitates ease of access by providing web enabled interface.

The SLC enhances the security design of corporate-to-plant network interface by facilitating a single connection between corporate and plant network through the firewall. Having a single connection between the corporate network and the plant networks yields the following advantages:

1. reduces processing and configuration load on the firewall since one set of firewall rules is required for only one computer;

2. reduces the probability of computer virus spread, since all traffic funnels through one computer only, being the SLC server; and 3. the SLC can also provide application visualization and representation capabilities, configured with special software, providing application compatibility and ease of access.

The present invention provides an improvement to the current security design adopted by international standards bodies looking after Process Control security such as ISA, API, and others. The current design, advocated by international standards bodies, calls for separating the corporate network from the plant network via a firewall system. The SLC computer according to the present invention improves this design by consolidating numerous network connections into a single security policy as will be discussed in more detail herein.

Figure 1:
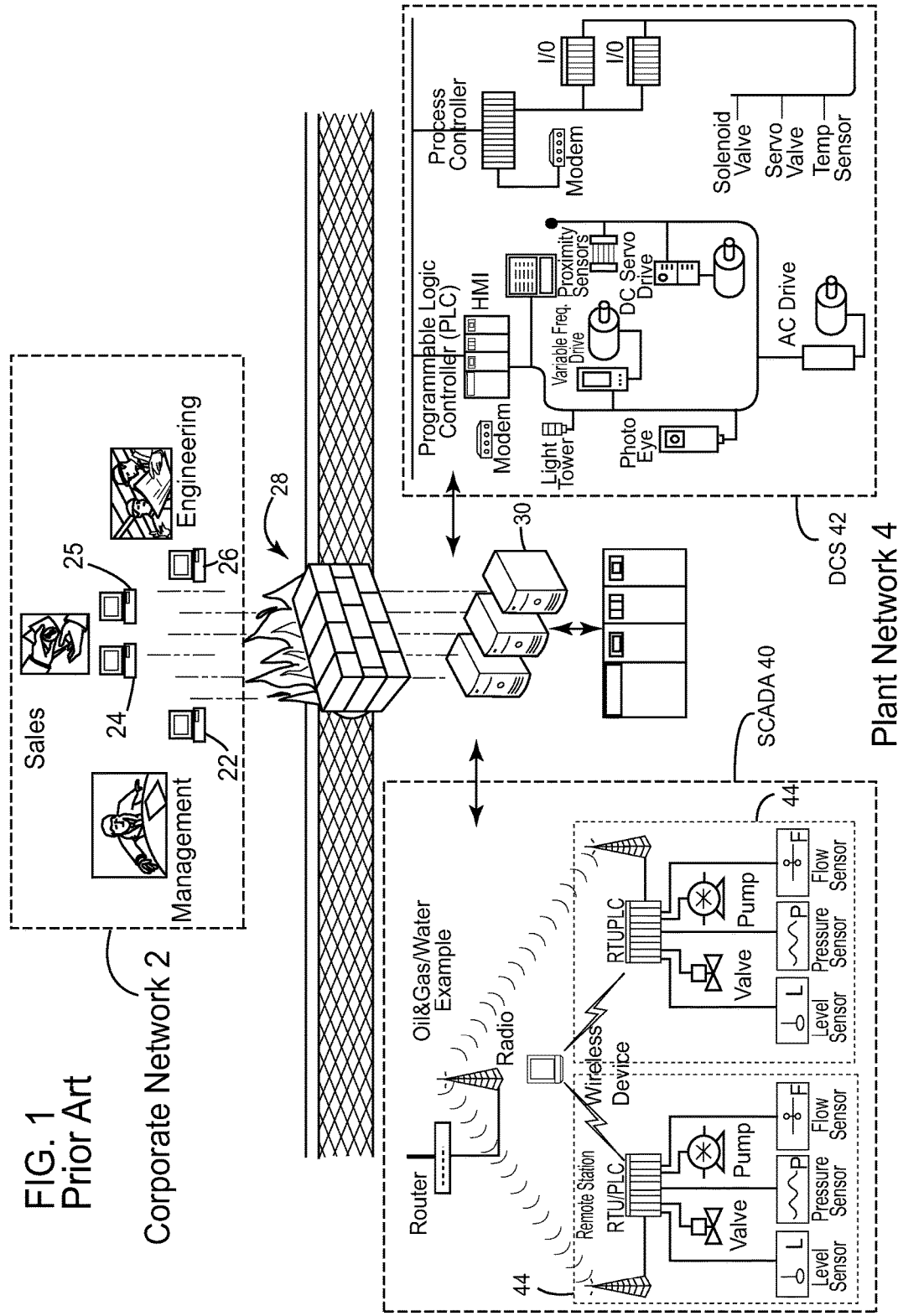
FIG. 1 is a functional block diagram of a network security architecture according to prior art.
Figure 2:
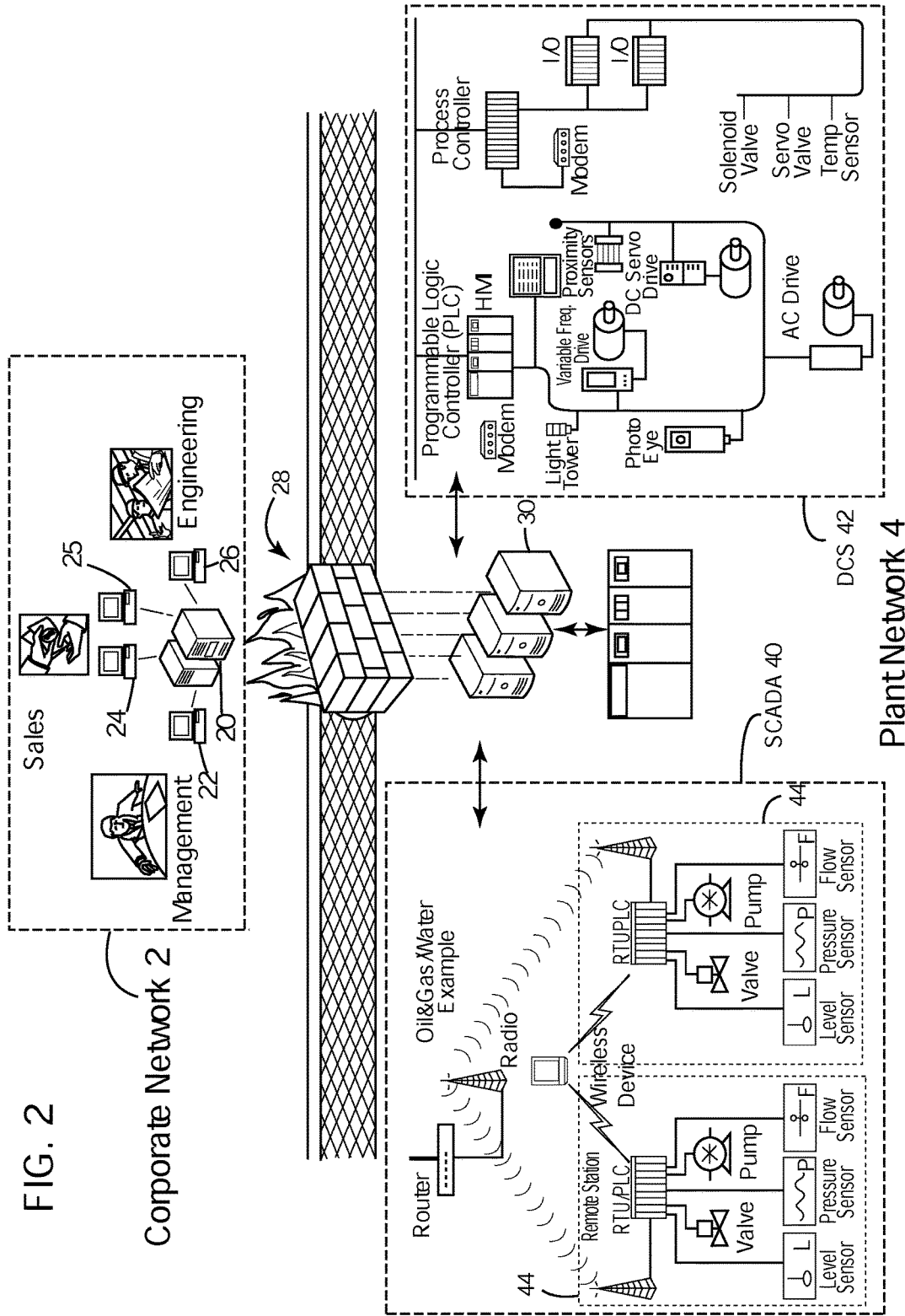
FIG. 2 is a functional block diagram of a network security architecture according to an exemplary embodiment of the present invention.
Figure 4:
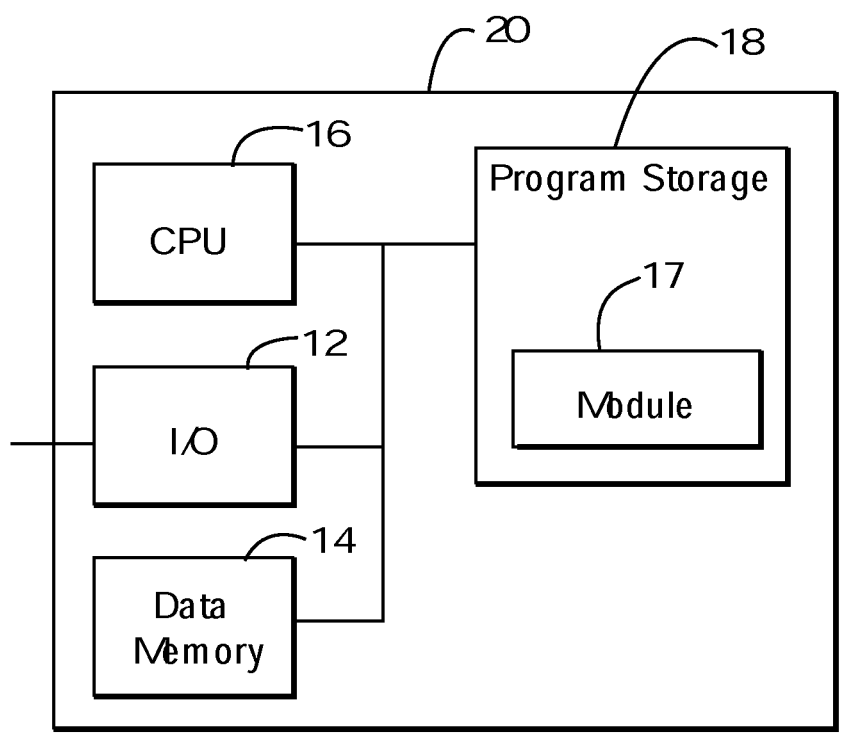
FIG. 4 is a functional block diagram of a single access control computer according to the invention.

According to the present invention, the SLC is a computer 20. The computer 20 is the only computer which is allowed to communicate with the plant network 4. Preferably, the SLC includes a single computer, in which case only a single computer is allowed to access the plant network 4. FIG. 2 shows one embodiment of the present invention in which an SLC computer 20 is provided on the corporate network 2 side. The SLC computer can be any computer or server with at least one processor for executing software applications as shown in FIG. 4, for example. Referring to FIG. 4, the computer 20 includes I/O ports (communication interface) 12 operable to communicate with user computers (work stations) 22-26 on the corporate network 2 and with plant applications on the process control network 4, a processor (CPU) 16 although multiple processors are possible depending on the size of the corporate network 2, a memory 14 coupled to the processor, and software or software modules 17 stored in a program storage 18 (e.g., hard drive) executable by the processor. The elements 12,14,16,18 are all connected to each other through a common bus 11.

Advantageously, the SLC computer 20 is adapted to host multi-user software applications which are capable of communicating with multiple users 22-26 (user computers or work stations) concurrently on the corporate network 2 and which are also capable of communicating with process applications that are running in the process control network 4 side. As shown in FIG. 2, only the SLC computer 20 is allowed to communicate with the plant network. In other words, applications running in individual user computers on the corporate network 2 side cannot directly communicate with plant applications in the plant network 4. If they tried, those communications would become blocked by a filtering device 28 that filters computer communication messages. One such device is a firewall device 28 as shown in FIG. 2. This way, only one set of security rules are needed for one computer (e.g., for one Internet Protocol address), which results in substantially reduced load on the firewall device 28 and substantially reduced security administration. Since all communication traffic funnels through one computer only, being the SLC computer 20, the probability of any user computer from spreading a virus or worm to the plant network is greatly reduced.

Although FIG. 4 diagrammatically illustrates the SLC computer 20, such computer can be used as any computer or server described herein such as the user computers 22-26, plant applications servers 30 running in the plant network 4 and firewall device 28 which may be a part of a switch/router.

In one embodiment, the SLC computer 20 stores and hosts in the program storage 18 a group of applications or modules 17. Referring back to FIG. 2, in one embodiment, an application hosting software called "Citrix XenApp" (formerly known as "Citrix Metaframe") from Citrix Systems, Inc. of Fort Lauderdale, Fla. is stored in the program storage 18 and is used to host various software applications that are adapted to communicate with various corresponding plant applications residing in the plant network 4. In other words, a power monitoring application running in the SLC computer 20 communicates with a corresponding or counterpart power monitoring application running in the plant applications server 30.

The hosting software essentially turns the SLC computer 20 into a hosting server that allows users or user computers 22-26, running an associated thin client software, to run the hosted application stored in the program storage 18 inside the SLC computer as if it were running in their own computers.

Specifically, the hosting software is a set of commercial server software that enables multiple users to launch hosted applications on the SLC computer 20 and view and interact with the hosted application, being executed inside the SLC computer, as if it were running on the user's own computer. If done correctly, the hosting software should bring the hosted application's user interface, audio, and print jobs to the user's computer in a way that is completely transparent to the users. Alternatively, a hosting software called Microsoft Remote Desktop can be used among many others.

The hosting software hosts a plurality of hosted applications which are stored in the program storage 18. The hosted applications are generally adapted to handle multiple users at the same time. Usually, while only a single image of the application is stored in the program storage 18, multiple instances of the application are executed by the processor 16 inside the SLC computer 20. Examples of the hosted applications are power monitoring application, vibration monitoring application and general data collection and analysis application. An example of a general data collection and analysis application is called "OSI PI" of OSIsoft, LLC of San Leandro, Calif. OSI PI hosted application is a software used to capture, process, and store plant data. OSI PI application communicates with various plant applications in the plant applications server 30 and also with various PI interface software installed at various data collection locations. The PI interface software standardizes the data collected from various disparate vendors' devices and works with a plurality of standard protocols along with older or even retired devices.

Referring to FIG. 2, an exemplary process flow of collecting data by a user will now be explained. Assume that a user sitting at a user computer 22 would like to obtain the current power levels of a particular plant. The user executes a client software in the user computer 22 which is associated with the hosting software stored in the SLC computer 20 and selects OSI PI as the hosted application. The hosting software in the SLC computer 20 starts and executes an instance of the OSI PI in the memory 14 of the SLC computer.

At the request of the user computer 22, the OSI PI application communicates with a power monitoring application running in the plant applications server 30. Alternatively, the OSI PI application may communicate directly with a PI interface module located at the plant where power is being measured or indirectly with the PI interface module through the power monitoring application running in the plant applications server 30.

Unlike the switches, routers and firewall, which communicate with the user computers 22-26 at layers 1, 2 and 3 of the Open System Interconnection (OSI) model, the SLC computer communicates at higher layers in one embodiment.

In the OSI model, there are seven layers (layers 1-7). Layer 7 (application layer) interacts with the operating system or application whenever a user (user computer) chooses to transfer files, read messages or perform other network-related activities. Layer 6 (presentation layer) takes the data provided by the application layer and converts it into a standard format that the other layers can understand. Layer 5 (session layer) establishes, maintains and ends communication with the receiving device. Layers 5-7 comprise an application set.

Layer 4 (transport layer) maintains flow control of data and provides for error checking and recovery of data between the devices. Flow control means that the transport layer looks to see if data is coming from more than one application and integrates each application's data into a single stream for the physical network. Layer 3 (network layer) handles the way the data will be sent to the recipient device. Logical protocols, routing and addressing are handled here. Layer 2 (data layer) assigns an appropriate physical protocol to the data. Also, the type of network and the packet sequencing is defined in this layer. Layer 1 (physical layer) defines the actual hardware. It defines the physical characteristics of the network such as connections, voltage levels and timing. Layers 1-4 comprise a transport set.

Among these layers, in one embodiment, the SLC computer 20 communicates at the higher layers defined by the application set. Preferably, the SLC computer 20 communicates with the user computers 22-26 and process applications at the application layer (layer 7) although some communication is also done in the presentation layer (layer 6).

Using layer 7 for communication, the SLC computer 20, which is essentially an application proxy solution, provides centralized application requests and seamless desktop virtualization capabilities that enable secure remote access to plant information resources.

Before the data requests from the OSI PI application can be transmitted, the firewall device 28 checks the messages to determine whether to allow the message to pass or block them. Because only the SLC computer 20 is allowed to send messages to the plant network 4, there is only one set of firewall rules to develop and maintain. All messages from computers other than the SLC computer 20 will be blocked. Preferably, only messages that originated by one of the hosted applications residing in the SLC computer 20 will be allowed to pass to the plant network 4 by the firewall device 28.

Similarly, all messages from the plant network 4 whose destination is the SLC computer 20 will be allowed to pass to the corporate network 2 by the firewall device 28.

Since the firewall separating the corporate network 2 from the plant network 4 will inspect traffic from preferably a single SLC computer 20, which is already protected and secured physically and logically, the SLC design significantly reduces the probability of virus and malware from spreading to and from the plant network 4.

Figure 3:
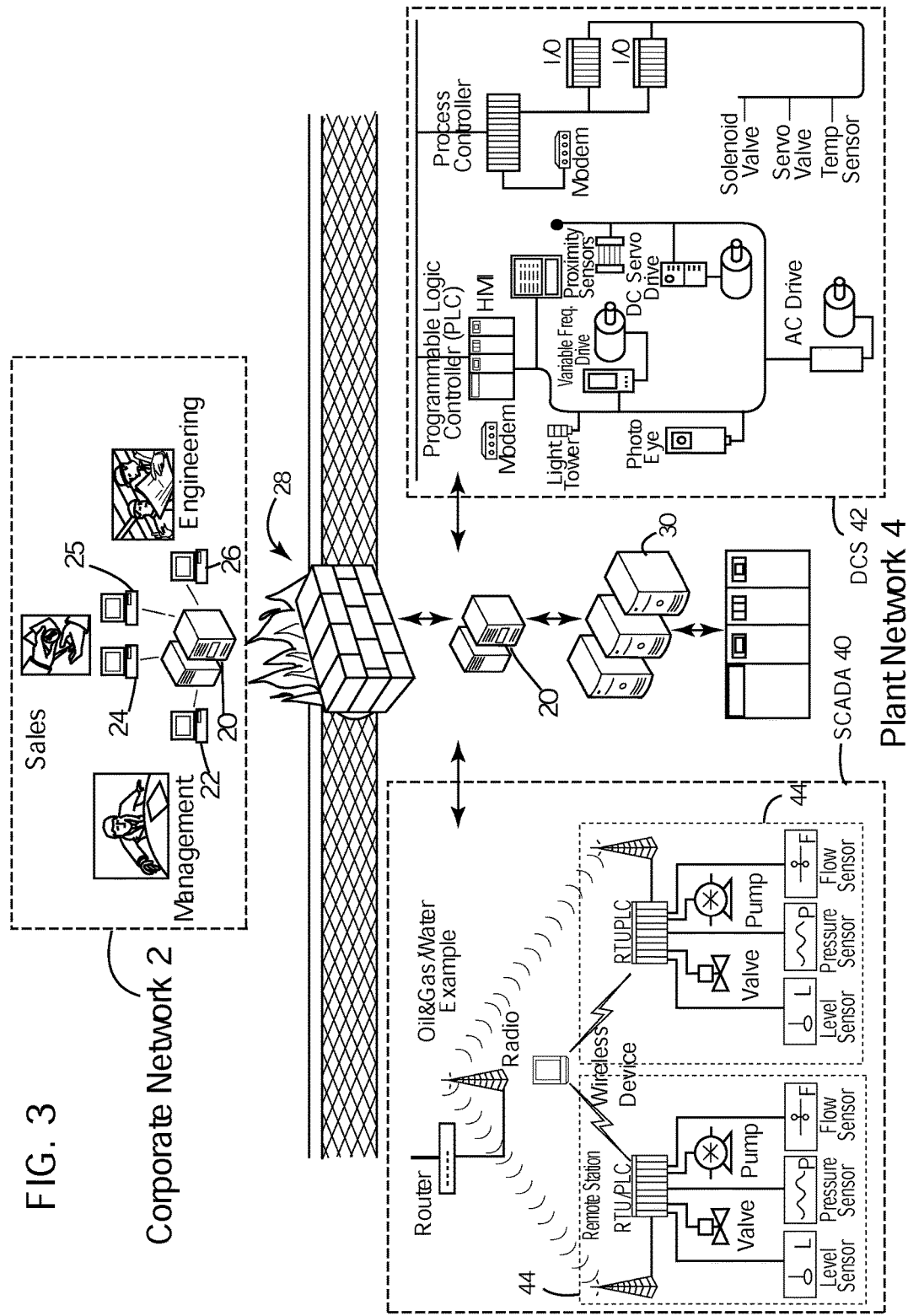
FIG. 3 is a functional block diagram of a network security architecture according to an alternative embodiment of the present invention.

FIG. 3 illustrates a functional block diagram of an alternative embodiment of the present invention. As shown in FIG. 3, the SLC computer 20 can be installed on the corporate network 2 side and the plant network 4 side of the network to bring about added traffic regulation in and out of both networks such that only applications running in the SLC computer between the two SLC computers 20 can communicate with each other.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A security system for interfacing a plant facility network and a plurality of computers in a corporate business network via a firewall, the system providing for minimization of the rule set for the firewall by unifying traffic flow between the corporate business network and the plant facility network, the system comprising:
- a first access control device located between the corporate business network and the firewall, the first access control device being in a multiplexer (MUX) configuration;
- a second access control device located between the firewall and the plant facility network, the second access control device being in a demultiplexer (DEMUX) configuration, such that the corporate business network, the first access device, the firewall, the second access device, and the plant facility network are configured in a series-connected unidirectional MUX-DEMUX configuration;
- wherein the first access control device is supplied with a multi-user application hosting platform, multiprotocol stack, the first access control device receiving a plurality of requests from computers on the corporate business network;
- wherein the second access control device is supplied with a multi-user application hosting platform, multiprotocol stack, the second access control device relaying one stream of requests from the first access control device to a plurality of system components on the plant facility network;
- wherein the firewall is programmed with a single rule such that the only communications that can pass through the firewall is a communication between the first access control device and the second access control device;
- wherein the plant facility network is a perimeter network serving as an interface to a plurality of autonomous systems containing process control field information and non-process applications such as closed circuit television (CCTV), asset management systems, and cybersecurity systems, and wherein the first and second access control systems are programmed such that plant management information systems data, as well as reports, logs and analysis information from CCTV, asset management, and cybersecurity systems that is addressed to one or more corporate network computers is transmitted via the second access control system, the firewall, and the first access control system; and
- wherein the first and second access control devices are programmed such that service request communications originating from the corporate business network computers and addressed to the plant facility network is transmitted via the first access control system, the firewall, and the second access control system.

2. The security system of claim 1, wherein the MUX configuration of the first access control device is implemented in hardware.

3. The security system of claim 1, wherein the MUX configuration of the first access control device is implemented in software.

4. The security system of claim 1, wherein the DEMUX configuration of the second access control device is implemented in hardware.

5. The security system of claim 1, wherein the DEMUX configuration of the second access control device is implemented in software.

6. The security system of claim 1, wherein the first and second access control devices each include a memory, a processor, a processor coupled to the memory, and hosting software stored in the memory and executable by the processor,
- wherein the hosting software of the first access control device is configured to communicate with a plurality of computers in the corporate business network; and
- wherein the hosting software of the second access control device is configured to communicate with the plurality of autonomous systems in the plant facility including process control field information and non-process applications such as closed circuit television (CCTV), asset management systems, and cybersecurity systems.

* * * * *